United States Patent [19]
Kesten

[11] 3,766,814
[45] Oct. 23, 1973

[54] AIR EJECT DIE-CUTTING ASSEMBLY
[75] Inventor: Martin Kesten, West Hartford, Conn.
[73] Assignee: Preston Engravers, Inc., Windsor, Conn.
[22] Filed: May 25, 1972
[21] Appl. No.: 256,959

[52] U.S. Cl. .................................. 83/99, 83/669
[51] Int. Cl. ............................................. B26d 7/06
[58] Field of Search ................. 83/98, 99, 100, 402, 83/331, 346, 347, 669

[56] References Cited
UNITED STATES PATENTS
3,172,321  3/1965  Schrader ............................ 83/100
3,274,871  9/1966  Ehlscheid ............................ 83/99

Primary Examiner—Frank T. Yost
Attorney—Peter L. Costas

[57] ABSTRACT

A rotary assembly for controlled fluid flow utilizes an external member having a chamber of generally circular cross section and an internal member seated therein for relative rotation therebetween. Both members have openings which are located for alignment upon such relative rotation, and the internal member has a passageway communicating with its opening and enabling the flow of fluid therethrough. An elongated recess is provided about the opening of one of the members, generally the internal one, and it has seated therein a radially compressed O-ring. The O-ring serves as a seal against the adjacent surface of the other of the two members, while permitting fluid flow between the openings thereof when in alignment. The assembly may be particularly adapted for rotary die cutting. The external member of such an assembly will be a die-cutting roll having a cutting element of closed configuration on its outside surface to which fluid may be directed from an internal manifold for the ejection of scrap, and air will normally be the fluid used.

31 Claims, 8 Drawing Figures

3,766,814

AIR EJECT DIE-CUTTING ASSEMBLY

BACKGROUND OF THE INVENTION

There are numerous applications in which it is desirable to effect intermittent registration between openings on adjacent surface of members which are rotatably mounted, one within the other; for example, such devices may serve as dynamic valves for the periodic discharge or influx of various fluids, as metering devices, and the like. Heretofore, attempts to minimize or prevent leakage between such members have involved the use of precision-made parts so as to ensure very close contact between the mating, relatively moving surfaces. Not only does this render manufacture unduly expensive due to the skill and/or the complex machinery required, but even when relatively high levels of accuracy have been achieved leakage frequently remains a problem, particularly after periods of use and consequential wear except in those instances in which the most durable materials have been used.

Gaskets and other sealing elements fabricated from resiliently deformable materials are, of course, very commonly used to prevent leakage between mating surfaces. However, they are not generally considered to be feasible for use in dynamic applications in which sharp-edged elements pass thereacross, due to the high shear stresses that are produced in the element as a result; such a condition exists when a surface opening passes over a sealing element mounted upon a closely adjacent surface. More particularly, since resilient sealing elements are generally under considerable compression in order to generate sufficient force therein for adequate sealing, release of the compressive force (such as by passage over an opening) would permit the sealing element to expand into the opening to a position of high vulnerability to shearing action. If damage to the element does not result, at the very least the edge of the opening would tend to dislodge the element from its seat, frequently jamming the relatively moving members and creating an even more severe exposure of the sealing element.

It is commonplace to produce various items, such as labels, tags, tickets and the like, by die cutting them from traveling web stock by the use of a roll having a cutting element of appropriate configuration on its outer surface. Holes and openings can be produced in such a manner, but serious problems arise largely as a result of the accumulation of scrap material within the die element, since such accumulations will quickly render the roll ineffective and may cause severe damage, such as bursting of the dies. In an effort to avoid such problems, it is now fairly common practice to employ hollow die-cutting rolls having apertures extending between the cavity and the surface thereof within the confines of the cutting elements, with air charged into the roll cavity being used to eject the lodged pieces of scrap therefrom. Since, however, the apertures of such a roll are always open to the atmosphere, air flows continuously therethrough, seriously diminishing the effectiveness of the system, especially when numerous apertures are provided. Firstly, such a design requires the use of unduly large volumes of high pressure air, and causes the air to impinge upon the scrap pieces with little impact. Secondly, it provides no means for controlling the direction or instant of scrap discharge, which results in haphazard release and scattering of previously ejected pieces about the vicinity of the die-cutting operation.

These problems have, by-and-large, been overcome in the air eject die-cutting assemklies described and claimed in copending applications for United States Letters Patent of Martin Kesten and Ralph Bruce O'Connor, Ser. Nos. 139,378 and 139,395, filed on May 3, 1971 and commonly assigned herewith, now U.S. Pat. Nos. 3,698,272 and 3,698,271 respectively. However, a need remains for a relatively simple and inexpensive rotary assembly for controlling fluid flow, wherein sealing is accomplished in a highly effective manner and wherein readily available sealing elements are used which can easily be replaced, if necessary.

Accordingly, it is an object of the present invention to provide a novel assembly for controlled fluid flow, wherein relatively rotating members having adjacent surfaces with fluid flow openings therein are sealed in a highly effective manner.

It is also an object of the invention to provide such a device wherein leakage of fluid is minimized, wherein the device exhibits an operating life of considerable duration, and wherein replacement of sealing elements is simple and convenient.

Another object is to provide an assembly having the foregoing advantages and features, which is relatively facile and inexpensive to manufacture and which may be employed with existing equipment with little or no alteration thereto.

A more specific object is to provide a novel rotary air eject die-cutting assembly having the foregoing features and advantages, in which the air supplied is employed in a highly efficient manner for the effective ejection of scrap particles.

SUMMARY OF THE INVENTION

It has now been found that the foregoing and related objects of the present invention are readily attained in a rotary assembly for controlled fluid flow comprising an external member and an internal member assembled therewith. The external member has a chamber therein of generally circular cross section and at least one fluid flow aperture with an opening on the inner surface of a chamber-defining wall thereof. The internal member is seated in the chamber of the external member for relative rotation therebetween; it has an outer surface portion in close proximity to the wall surface of the external member, and a fluid flow passageway with at least one opening on the outer surface portion thereof for registry with the aperture opening of the external member. An elongated recess is formed about the opening on either inner surface of the external member or the outer surface of the internal member. The assembly also includes a normally generally toroidal sealing element which is fabricated from a resiliently deformable synthetic resinous material, and is radially compressed to seat in the recess with a surface portion thereof bearing upon the other of the inner and outer surfaces so as to seal the opening adjacent the recess thereagainst. The recess is dimensioned and configured to so dispose the sealing element as to permit fluid flow through the center thereof and through the openings when in registry, to thereby provide a controlled flow of fluid therebetween.

In preferred embodiments of the invention, the external member is generally cylindrical and has a cylindrical cavity extending inwardly from one end to provide the chamber therein. In such embodiments, the internal member has a cylindrical portion which is inserted axially into the cavity from the "one" end of the external member and provides the outer surface portion of the internal member. The passageway may extend axially in such a cylindrical portion, and the opening thereof may comprise a port extending generally radially therefrom. Normally, the internal member will have an inlet communicating with the passageway, and will be substantially closed to the flow of fluid except through the inlet and the opening of the passageway. Coupling means may be provided adjacent the inlet for engagement with a source of pressurized air, so as to enable delivery of air to the passageway.

The assembly may in addition include a support member adapted for mounting the internal member in a stationary position on a chassis, and it may have means for pivoting the cylindrical portion to alter the direction of fluid flow through the "one" opening thereof and to secure it in any of a multiplicity of such pivoted positions. At least one bearing member of generally circular cross section may be provided on the internal member with a circumferential surface dimensioned and configured to bear upon the wall surface of the external member. Generally, the external member will have a plurality of fluid flow apertures with openings on the surface of the chamber-defining wall thereof, and such openings may be spaced circumferentially on the surface and/or axially along the length thereof. In the latter instance, the internal member will also have a plurality of openings spaced along its length for registry with the aperture openings. Most desirably, the recess is formed in the outer surface of the internal member, and has a straight-sided oval configuration that is elongated in a generally axial direction.

The resin used for the sealing element preferably has a Shore A durometer hardness value of about 60 to 100, and most desirably of about 80 to 95; it beneficially is highly resistant to the deteriorative and swelling effects of hydrocarbon lubricants (such as the oils which are normally present in air lines), in addition to exhibiting high levels of resistance to set, tear and heat degradation. Specifically, the resin may be a fluorocarbon polymer, especially valuable candidates being the vinyl fluoride copolymer elastomers of the type produced with hexafluoropropylene.

Specific objects of the invention are attained by the provision of a rotary die-cutting assembly including a die-cutting roll adapted for journaling in a press, and having a cylindrical cavity extending axially inwardly from one end thereof with a cutting element of closed configuration on its outside surface. At least one aperture, comprising substantially the only outlet for fluid from the roll, extends from the cavity to a location on the outside surface within the confines of the cutting element so as to enable fluid flow between the cavity and the cutting element. A fluid delivery manifold has a cylindrical portion inserted axially into the cavity from the "one" end of the roll for relative rotation therebetween, and the cylindrical portion is dimensioned and configured to seat in the cavity with its outer surface in close proximity to the inside surface of the roll which defines the corresponding portion of the cavity. A passageway extends axially in the cylindrical portion and has an outlet opening at a point on the outer surface thereof in a location for registry with the "one" aperture of the roll. The outlet comprises at least one generally radially extending port, and an elongated recess is formed either in the outer surface of the cylindrical portion about the port thereof, or in the inner surface of the roll about its aperture. The manifold has an inlet communicating with the passageway of the cylindrical portion and is substantially closed to the flow of fluid except through its inlet and outlet. In addition, a normally generally toroidal sealing element, which is fabricated from a resiliently deformable synthetic resinous material, is radially compressed and seated in the recess with a surface portion thereof bearing upon the other of the two surfaces to effect a seal thereagainst. The recess is dimensioned and configured to so dispose the sealing element as to permit fluid flow through the port and aperture when in registry, to provide controlled fluid flow therebetween.

Preferably, the foregoing assembly additionally includes coupling means adjacent the inlet end of the manifold for engagement with a source of pressurized air to enable delivery of air into the passageway. It will also include a support member for the manifold which is adapted for mounting in a stationary position on the press. Rotation of the roll about the cylindrical portion will thereby cause intermittent registry of the "one" aperture and the "one" port, thus permitting air to flow from the source thereof outwardly through the "one" port in a radial direction. Most desirably, the support member will have means for pivoting the cylindrical portion to alter the direction of air flow through the "one" port therein and to secure it in any of a multiplicity of such pivoted positions, thereby enabling control of the direction of air flow.

The roll will normally have a second cutting element on its outside surface with the "only" outlet therefrom including a second of such apertures extending, as hereinbefore set forth, to a location within the second cutting element. In such a case, the "one" and "second" apertures may open at generally circumferentially aligned points on the inside surface of the roll for sequential registry with the "one" port of the cylindrical portion during rotation of the roll thereby. The "one" and "second" apertures may also open at axially spaced points on the inside surface of the roll, in which event the outlet of the cylindrical portion will include at least a second port which opens independently of, and at a point spaced axially from, the first port on the outer surface thereof, thus enabling intermittent registry with the "second" aperture of the roll. In most embodiments, the roll will have at least one additional cutting element and at least one additional aperture, which cooperates to provide the "only" outlet therefrom and extends to a location within the additional cutting element. Such an additional aperture will open on the inside surface of the roll at a point that is generally circumferentially aligned with the point of opening of the "one" aperture thereof, thereby permitting sequential registry of the "one" and "additional" apertures with the "one" port of the cylindrical portion.

DETAILED DESCRIPTION OF THE ILLUSTRATED EMBODIMENT

Figure 1:
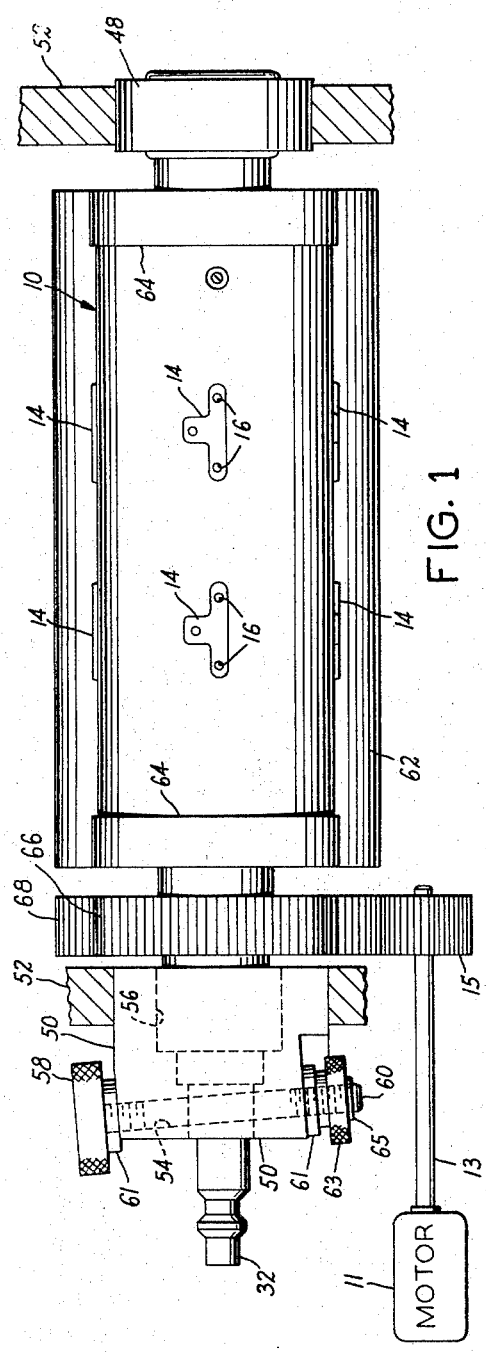
FIG. 1 is a plan view of a rotary air eject die-cutting assembly embodying the present invention.

Turning now in detail to the appended drawing, therein illustrated is a rotary air-eject die-cutting assembly embodying the present invention and consisting of a die-cutting roll, generally designated by the numeral 10, having a bore 12 extending axially therethrough and a multiplicity of cutting elements or dies 14 of closed configuration on the outside surface thereof. The dies 14 are spaced about the roll 10 in aligned axial rows and circumferential columns, and are designed to cut openings having the configuration shown, such as to provide a button hole in a tag for attachment to clothing. A multiplicity of radial apertures 16 extend from the bore 12 to the outside surface of roll 10 at locations within the confines of each of the dies 14. The inner ends of the apertures 16 are aligned in axial rows and circumferential columns corresponding to the dies 14, and a set of three apertures 16 is associated with each die 14 for optimum ejection effectiveness, consistent with the die configuration. A plug (not visible) is engaged in the right end (as viewed in FIGS. 1 and 2) of the shaft portion of the roll 10 to provide an air seal for the bore 12 thereat.

Figure 5:
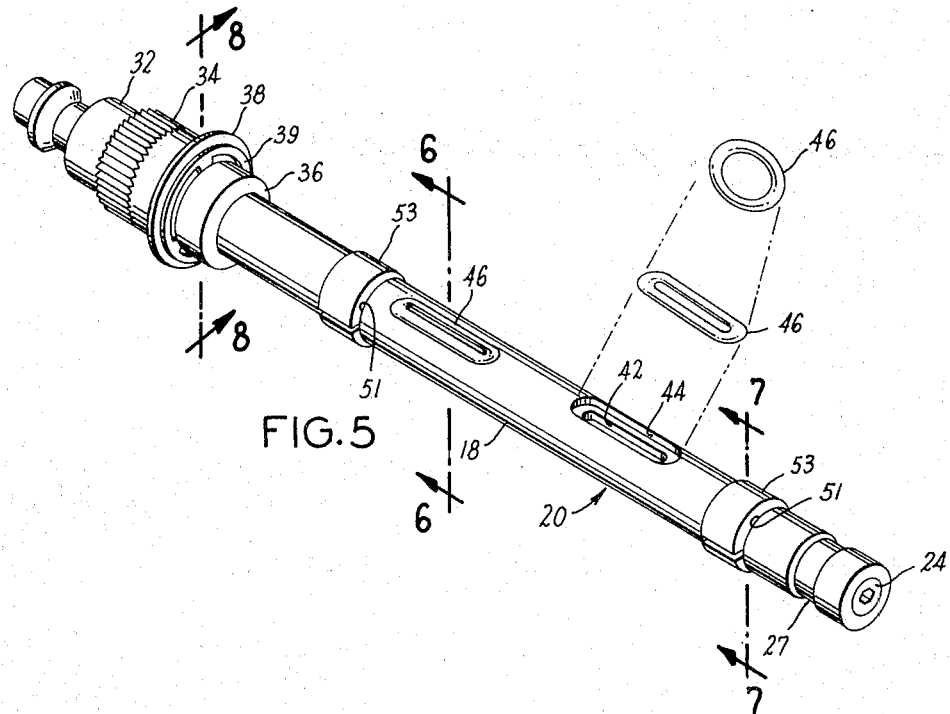
FIG. 5 is an isometric view of the manifold employed in the assembly of FIG. 1, drawn to an enlarged scale and with one of the sealing elements removed to show the slot formed in the surface.
Figure 6:
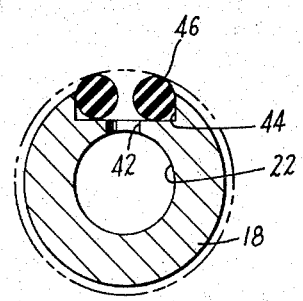
FIG. 6 is a sectional view of the manifold along line 6—6 of FIG. 5 and drawn to a further enlarged scale.
Figure 7:
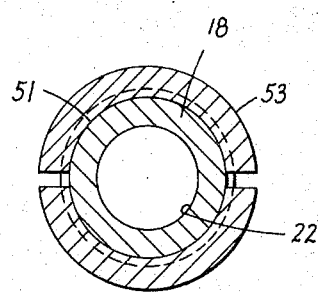
FIG. 7 is a similar view along line 7—7 of FIG. 5.
Figure 8:
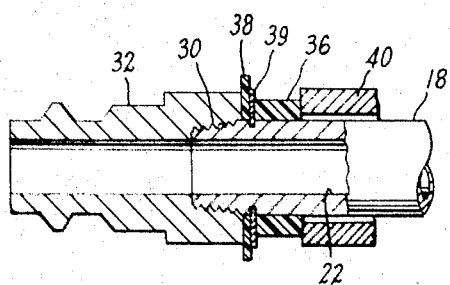
FIG. 8 is a fragmentary sectional view of the left end of the manifold along line 8—8 of FIG. 5.

Seated within the bore 12 of the roll 10 is the cylindrical core portion 18 of an air distribution manifold, generally designated by the numeral 20 and most clearly illustrated in FIG. 5. The core portion 18 has an axial passageway 22 extending therethrough and closed at its inner end by a set screw 24 threadably engaged therein. A set screw 26 is threadably engaged in a radial aperture 28 of the roll 10 and projects into the groove 27 which is machined in the end of the core portion 18; the function of the screw 26 is to retain the roll 10 against inadvertent disassembly from the manifold 20 when the assembly is dismounted from the die-cutting press on which it is used. The outer end 30 of the core portion 18 is externally threaded, and engages thereon a hose coupling nipple 32 that is of conventional design, except for the splined portion 34 that extends circumferentially thereabout. Relatively wide and relatively thin washers 36,38 respectively (which are desirably fabricated from a tetrafluoroethylene type of synthetic resin) cooperate with the snap ring 39 to provide abutment elements for the adjacent end 40 of the roll 10.

Figure 2:
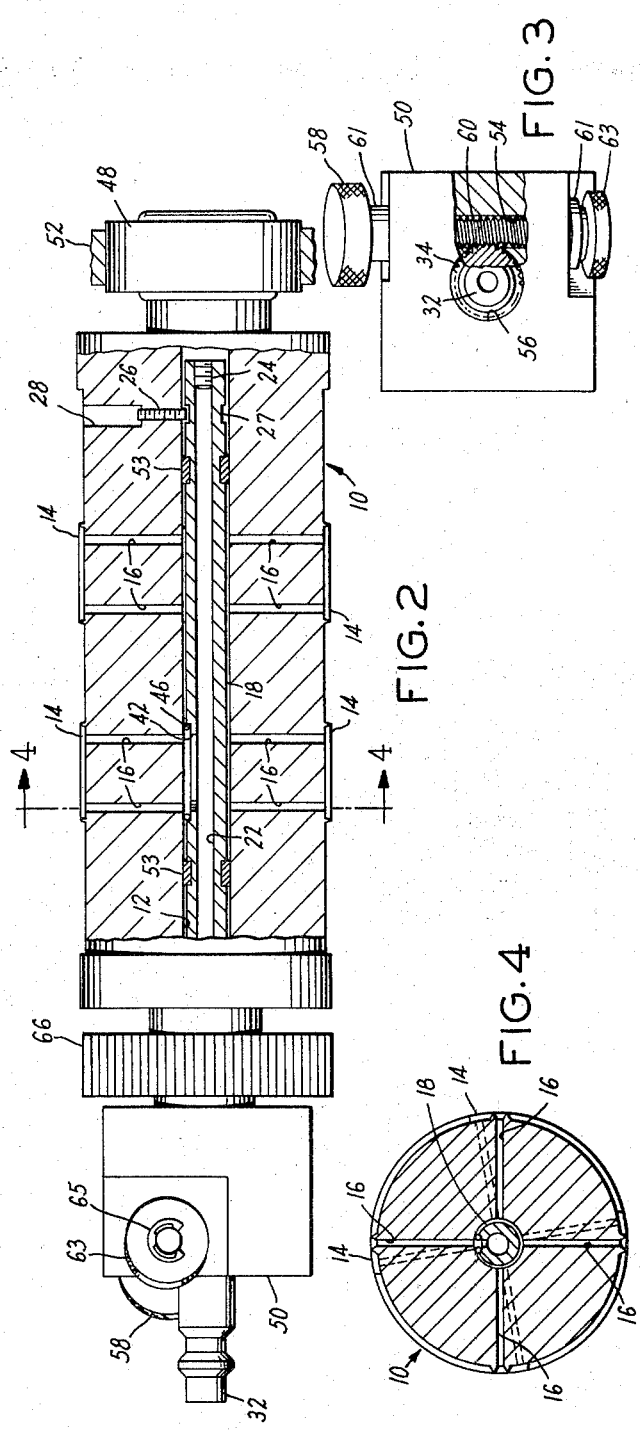
FIG. 2 is a longitudinal view in partial section of the assembly of FIG. 1.
Figure 3:
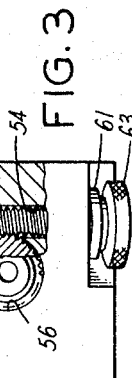
FIG. 3 is an end view thereof with a portion of the bearing block broken away to show the angular adjustment mechanism.
Figure 4:
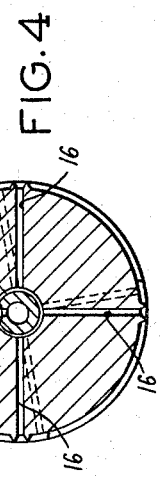
FIG. 4 is a cross-sectional view of the assembly taken along line 4—4 of FIG. 1.

Two axially extending elongated ports or slots 42 are formed through the wall of the core portion 18 of the manifold 20 to provide air flow communication with the passageway 22 therein. Larger slots 44 are machined thereabout in the surface of the core portion 18 to provide recesses for the toroidal sealing elements (O-rings) 46, which are radially compressed (as shown in FIG. 5) and inserted therein. The ports 42 and associated slots 44 are circumferentially displaced from one another so that the sets of apertures 16 associated with each circumferential column of dies 14 register intermittently with one of them as the roll 10 rotates about the core portion 18, thereby maximizing the pressure acting within any given die 14. A circumferential channel 51 is formed in the core portion 18 adjacent each end thereof, and has a split bushing 53 (desirably made of bronze or a comparable bearing material) fixedly mounted therein. As can be seen in FIG. 2 of the drawings, the bushings 53 bear upon the surface defining the base 12 of the roll 10, and provide firm support for the core portion 18 while preventing undue internal wear.

Press fit upon the ends of the shaft portions of the roll 10 are bearing assemblies (not shown) which are, in turn, received in bearing blocks 48,50 stationarily supported on frame portions 52 of the press, to journal the roll 10 thereon. The bearing block 50 has formed in its upper portion an angularly disposed aperture 54 which intersects tangentially with the axial passageway 56 therethrough, and the thrust washer 38 and snap ring 39 of the manifold seat within the passageway 56 to abut against an internal shoulder of the block 50 so as to prevent disassembly of the manifold 20 under air pressure. An adjustment screw 58 has its threaded shaft 60 inserted in the aperture 54 in meshing engagement with the splined portion 34 of the hose coupling nipple 32, and the washers 61 thereon permit non-locking adjustment of the screw 58. It will be evident that turning the screw 58 in the aperture 54 will cause the manifold 20 to pivot within the block 50, altering the radial direction in which air injected into the passageway 22 of the core portion 18 will discharge from the ports 42 thereof. The lock nut 63, maintained on the shaft 60 by the snap ring 65, may be tightened to secure the screw 58 in the position necessary to maintain the selected angular attitude of the core portion 18. The illustrated adjustment mechanism may be modified or replaced by equivalent means, if so desired.

To protect the dies against undue wear by contact with the surface of the anvil roll 62 that is cooperatively journaled below the cutting roll 10, bearers 64 are provided on the ends thereof, as is now common practice. A driven gear 66 is fixed upon the end 40 of the shaft portion of the cutting roll 10, and it meshes with the drive gear 68 that is fixed on a common shaft with the anvil roll 62. The drive gear 68 in turn meshes with the drive pinion 15 mounted on the shaft 13 of the motor 11, which is diagrammatically represented.

In operation, the web stock (not shown) passes between the nip of the rolls 10,62 as they are driven in opposite directions by the motor 11, with the dies 14 cutting scrap pieces from the web. Simultaneously, air under pressure (e.g., line pressures of about 80 – 100 psi are commonly available) is injected into the manifold 20 through the nipple 32, with the core portion 18 maintained at a set angular attitude. Due to the sealing action of the O-rings 46 against the surface of the base 12, substantially no air flows through the manifold 20 when none of the ports 42 is aligned with an aperture 16, thus conserving air and maintaining the pressure thereof at a high value. As the cutting roll 10 rotates about the stationary core portion 18, each set of apertures 16 comes into registry with the port 42 that is axially aligned therewith, permitting air to flow therethrough so as to eject any scrap piece that may be lodged in the associated die 14. Due to the circumferential offset of the ports 42, at any given instant air flow is substantially limited to one of the dies 14, with the dies 14 that are axially aligned therewith in a single row receiving air sequentially thereafter. This flow pattern occurs in each row of dies 14 as the apertures 16 associated therewith are presented for registry with the ports 42 during rotation of the roll 10. Although, as has been mentioned, a center-to-center spacing of 5° is typical, this relationship may vary depending largely upon the number of ports 42 provided, which may also vary from one to substantially any number, with 8 – 10 often being a practical upper limit and 4 being most common. In any case, the offset of the ports 42 will generally be as small as possible consistent with a desirable level of independence of air flow through the dies 14. This will minimize the space in which air and scrap pieces discharge from the assembly, and thereby reduce scattering, facilitate collection of the pieces, and/or utilize the air stream most effectively. Frequently, the optimal direction of the air flow (which will depend upon the relationship of the die-cutting and anvil rolls 10,62, the travel of the web stock relative thereto, and upon other factors) will most effectively be determined by trial and error, and the adjustability of the manifold 20 is of considerable advantage in this regard because changes in attitude may be readily made, even during operation.

As will be appreciated, the nature of the material from which the toroidal sealing element is fabricated may be of critical importance to the provision of a satisfactory assembly in accordance herewith. This will of course depend upon the dynamic level at which the assembly is intended to operate and also its environment, including the nature of the fluid which is to flow therethrough. Thus, if the dynamic level (i.e., rotation rate) of the assembly is low, the shear force generated between the relatively moving surfaces may be relatively small, enabling the use of a sealing element fabricated from a material that is fairly soft and pliant. Similarly, the presence of a lubricating fluid (which will frequently be an inherent quality of liquids flowing through the assembly) will also render the conditions to which the sealing element is subjected less severe, and will enable the use of less durable materials, albeit with some consideration being necessary for the effect of the liquid upon the material. Consequently, the least severe circumstances will generally exist when the assembly rotates at a relatively low speed and is utilized for the control of liquid flow.

On the other hand, high rates of relative rotation of the members of the assembly will tend to expose the sealing elements to relatively severe conditions, as will the absence of any significant amount of lubricating substance tending to reduce the frictional resistance thereof. Consequently, it will be evident that the most severe conditions will normally exist in a system operating at high speeds without substantial lubrication, as is the case in an air eject rotary die-cutting system of the type which constitutes a preferred embodiment of the invention.

Although it has been found that the choice of the synthetic resin used for the sealing elements is particularly significant to the provision of a satisfactory assembly for high speed operation, even under less harmful conditions the choice of the material will frequently be highly significant. Hardness is a principal factor in the selection, due largely to the advantageous use of relatively incompressible elements for sealing. As has been mentioned previously, to develop sufficient sealing force utilizing a compressible resin, the element must be maintained in a relatively highly distorted condition. Hence, when the compressive influence is removed, as occurs during passage over an opening, such a material tends to resume its normal configuration and thus become exposed to shear action. Relatively incompressible resins, on the other hand, are capable of high levels of sealing force with relatively little dimensional change, and there is therefore little tendency for the element to expand into an opening to assume a highly vulnerable posture.

Typically, resins utilized for the more dynamic levels of operation will have Shore A hardness values in excess of 60; as a practical matter, resins having values greater than about 100 tend to be unduly brittle, and therefore to be unsatisfactory for the present application. Generally, resins exhibiting Shore A values 80 – 95 will be most desirable.

Among the other criteria which are significant in the selection of the resin for the sealing elements, resistance to oil swelling and deterioration will often be of foremost importance since, even if the assembly itself is not lubricated, systems in which it is employed will often contain oil. This will generally be true even in air discharge systems due to the use of oil-lubricated compressors and the like, and frequently rust inhibitors and other agents employed will be hydrocarbon based, and hence harmful to certain resins. Of comparable importance is the ability of the resin to resist abrasion, since the frictional forces and abrasive action to which they are subjected will be normally quite significant. To enable adequate sealing over extended periods of time, the resin should have a good resistance to set (i.e., to permanent dimensional change resulting from continued compression), and it should also be relatively resistant to tearing and to heat degradation; the tensile strength of the resin will also be a consideration.

With these factors in mind, it will be understood that the specific resin employed in any given instance will vary depending upon the conditions of operation. For example, where oil resistance is not of significant concern, the buna S and ethylene propylene types of synthetic rubbers might be employed. On the other hand, when this factor is important and other characteristics are of less significance, the buna N and fluoroethylene types of resins could be used. From the standpoint of exhibiting the most desirable overall balance of properties for the present applications, and especially where operation is highly dynamic and the system is employed for oil-laden air delivery, the vinylidene fluoride copolymer elastomers are particularly desirable, and their use constitutes a preferred embodiment of the invention. Especially desirable resins are the copolymeric products of vinylidene fluoride and hexafluoropropylene, which is believed to be the composition of resins sold under the VITON trademark by E. I. du Pont de Nemours & Co.

By way of definition, the members of the present assemblies will generally operate with their adjacent surfaces moving relative to one another at a linear rate of about 5 to 100 feet per minute, and such operation is considered to be dynamic in accordance herewith. Generally, rates of speed at the upper end of the range will be preferred for obvious reasons; however, practical considerations may impose limitations thereon, one such consideration being the need to permit adequate drying time for inks that might be applied on the press in a concurrent printing operation. Normally, the practical upper limit of such relative movement will be about 50 feet per minute, and speeds below about 30 feet per minute will usually be considered to be unduly slow. A surface rate of 30 to 50 feet per minute in an air ejection assembly will produce rather severe operating conditions, normally warranting the use of a hard resin having a Shore A durometer value in excess of 60.

Although the theory of the present invention is not fully understood, it is believed that the manner in which the recess in the surface of either the internal or external member disposes the sealing element permits passage across openings with a minimum amount of harm. It is also believed that the position of the cuved surface of the toroidal element only slightly above the adjacent surface permits the edges of such openings to slide thereon and to, in effect, cam the element into the recess, thereby providing utmost protection without sacrificing sealing ability.

Thus, it can be seen that the present invention provides a novel assembly for controlled fluid flow, wherein relatively rotating members, which have adjacent surfaces with fluid flow openings therein, are sealed in a highly effective manner. Leakage of fluid from the device is minimized, while an operating life of considerable duration is afforded and replacement of sealing elements in a simple and convenient manner is enabled. The assembly is relatively facile and inexpensive to manufacture, and it may be employed with existing equipment with little or no alteration thereto. Although the assembly may be adapted for liquid flow, it will generally be most well suited for air flow control. More specifically, the invention provides a novel rotary air eject due-cutting assembly having the foregoing features and advantages, in which the air supply it utilized in a highly efficient manner for the effective ejection of scrap particles. While the feature has not been stressed herein, use of the assembly under vacuum rather than positive pressure is also contemplated. For example, an assembly having appropriately disposed vacuum nipples might be employed in combination with a die-cutting roll to remove scrap portions from the backing material, and to subsequently release the scrap by reliance upon the flow control features described herein. Finally, it will be appreciated that the use of the toroidal sealing elements reduces the need for precise linearity in the mating surfaces by accommodating to variations so as to maintain effective sealing, and also diminishes the possibility of seizure therebetween.

Having thus described the invention, I claim:

1. A rotary assembly for controlled fluid flow, comprising: an external member having a chamber therein of generally circular cross seciton and at least one fluid flow aperture with an opening on the inner surface of a chamber-defining wall thereof; an internal member seated in said chamber of said external member for relative rotation therebetween with an outer surface of said internal member in close proximity to said wall surface of said external member, said internal member having a fluid flow passageway therein with at least one opening on said outer surface thereof located for registry with said opening of said aperture, and one of said inner and outer surface having an elongated recess formed about said opening thereof; and a normally generally toroidal sealing element fabricated from a resiliently deformable synthetic resin and radially compressed to seat in said recess with a surface portion thereof bearing upon the other of said inner and outer surfaces to seal the opening adjacent said recess thereagainst, said recess being dimensioned and configured to so dispose said sealing element as to permit fluid flow through the center thereof and through said openings when in registry to provide a controlled flow of fluid therebetween.

2. The assembly of claim 1 wherein said external member is generally cylindrical and has a cylindrical cavity extending inwardly from one end providing said chamber therein, and wherein said internal member has a cylindrical portion inserted axially into said cavity from said one end of said external member and providing said outer surface of said internal member.

3. The assembly of claim 2 wherein said passageway extends axially in said cylindrical portion of said internal member, and wherein said opening comprises a port extending generally radially therefrom.

4. The assembly of claim 3 wherein said internal member has an inlet communicating with said passageway and is substantially closed to the flow of fluid except through said inlet and opening thereof.

5. The assembly of claim 4 additionally including coupling means adajcent said inlet for engagement with a source of pressurized air for delivery of air to said passageway.

6. The assembly of claim 2 additionally including a support member adapted for mounting said internal member in a stationary position on a chassis, and having means for pivoting said cylindrical portion to alter the direction of fluid flow through said one opening therein and to secure it in any of a multiplicity of such pivoted positions.

7. The assembly of claim 2 wherein said internal member includes at least one bearing of generally circular cross section having a circumferential surface dimensioned and configured to bear upon said inner wall surface of said external member.

8. The assembly of claim 2 wherein said external member has a plurality of said fluid flow apertures with openings on said inner surface of said chamber-defining wall thereof.

9. The assembly of claim 8 wherein said openings of said apertures are spaced circumferentially on said inner surface.

10. The assembly of claim 8 wherein said openings of said apertures are spaced axially along the length of said external member, and wherein said internal member has a plurality of said openings spaced along the length thereof for registry with said aperture openings.

11. The assembly of claim 2 wherein said recess is formed in said outer surface of said internal member, and has a straight-sided oval configuration that is elongated in a generally axial direction.

12. The assembly of claim 1 wherein said resin has a Shore A durometer hardness value of about 60 to 100.

13. The assembly of claim 1 wherein said resin has a Shore A durometer hardness value of about 80 to 95.

14. The assembly of claim 13 wherein said resin is a fluorocarbon polymer.

15. The assembly of claim 14 wherein said polymer is a vinylidene fluoride copolymer elastomer.

16. The assembly of claim 15 wherein said elastomer is a copolymer of vinylidene fluoride and hexafluoropropylene.

17. A rotary die-cutting assembly comprising: a die-cutting roll adapted for journaling in a die-cutting press and having a cylindrical cavity extending axially inwardly from one end thereof and a cutting element of closed configuration on its outside surface with at least one aperture extending from said cavity to a location on said outside surface within the confines of said cutting element, said aperture enabling fluid flow between said cavity and said cutting element and comprising substantially the only outlet for fluid from said roll; a fluid delivery manifold having a cylindrical portion inserted axially into said cavity from said one end of said roll for relative rotation therebetween and being dimensioned and configured to seat in said cavity with its outer surface in close proximity to the inner surface of said roll defining the corresponding portion of said cavity, said cylindrical portion having an axially extending passageway therein with an outlet comprising at least one generally radially extending port opening at a point on said outer surface thereof in a location for registry with said one aperture of said roll, one of said inner surface of said roll and said outer surface of said cylindrical portion having formed therein an elongated recess about said aperture and port thereof, said manifold having an inlet communicating with said passageway of said cylindrical portion and being substantially closed to the flow of fluid except through said inlet and outlet; and a normally generally toroidal sealing element fabricated from a resiliently deformable synthetic resin and radially compressed to seat in said recess with a surface portion thereof bearing upon the other of said inner and outer surfaces to affect a seal thereagainst, said recess being dimensioned and configured to so dispose said sealing element as to permit fluid flow through said port and aperture when in registry to provide controlled fluid flow therebetween.

18. The assembly of claim 17 additionally including coupling means adjacent said inlet of said manifold for engagement with a source of pressurized air for delivery of air to said passageway, and a support member for said manifold adapted for mounting in a stationary position on the press, so that rotation of said roll about said cylindrical portion causes intermittent registry of said one aperture and said one port, permitting air to flow from the source thereof outwardly through said one port in a radial direction.

19. The assembly of claim 18 wherein said support member has means for pivoting said cylindrical portion to alter the direction of air flow through said one port therein and to secure it in any of a multiplicity of such pivoted positions, the direction of radial flow of air through said one port thereby being controlled by said pivoting means.

20. The assembly of claim 17 wherein said recess is formed in said outer surface of said cylindrical portion, and has a straight-sided oval configuration that is elongated in a generally axial direction.

21. The assembly of claim 17 wherein said roll has a second of said cutting elements on said outside surface thereof and said only outlet therefrom includes a second of said apertures so extending to a location therewithin, with said one and second apertures opening at generally circumferentially aligned points on said inner surface of said roll for sequential registry with said one port of said cylindrical portion during rotation of said roll thereabout.

22. The assembly of claim 17 wherein said roll has a second of said cutting elements on said outside surface thereof and said only outlet therefrom includes a second of said apertures so extending to a location therewithin, with said one and second apertures opening at axially spaced points on said inner surface of said roll, and wherein said outlet of said cylindrical portion includes at least a second of said ports, said second port opening independently of said first port on said outer surface of said cylindrical portion at a point spaced axially therefrom, for intermittent registry with said second aperture of said roll.

23. The assembly of claim 22 wherein said axially spaced points of opening of said first and second ports of said cylindrical portion are circumferentially offset from one another.

24. The assembly of claim 22 wherein said roll has at least an additional of said cutting elements and at least an additional of said apertures providing said only outlet therefrom and so extending to a location therewithin, said additional aperture opening at a point on said inner surface that is generally circumferentially aligned with said point of opening of said one aperture for sequential registry of said one and additional apertures with said one port of said cylindrical portion.

25. The assembly of claim 17 wherein said synthetic resin has a Shore A durometer value of about 80 to 95.

26. The assembly of claim 25 wherein said synthetic resin is highly resistant to deteriorative and swelling effects of hydrocarbon lubricants.

27. The assembly of claim 26 wherein said synthetic resin exhibits high levels of resistance to set, tear, and heat degradation.

28. The assembly of claim 27 wherein said resin is a vinylidene fluoride copolymer elastomer.

29. The assembly of claim 28 wherein said elastomer is a copolymer of vinylidene fluoride and hexafluoropropylene.

30. The assembly of claim 1 additionally including a motor operatively connected to one of said internal and external members to effect relative rotation therebetween in a continuous manner when in operation.

31. The assembly of claim 30 wherein said motor is adapted to rotate said members at a relative speed, at said surfaces thereof, of 5 to 100 lineal feet per minute.

* * * * *